Sept. 8, 1925.
R. TAEUBERT
SIGNALING DEVICE
Filed March 24, 1921
1,553,121
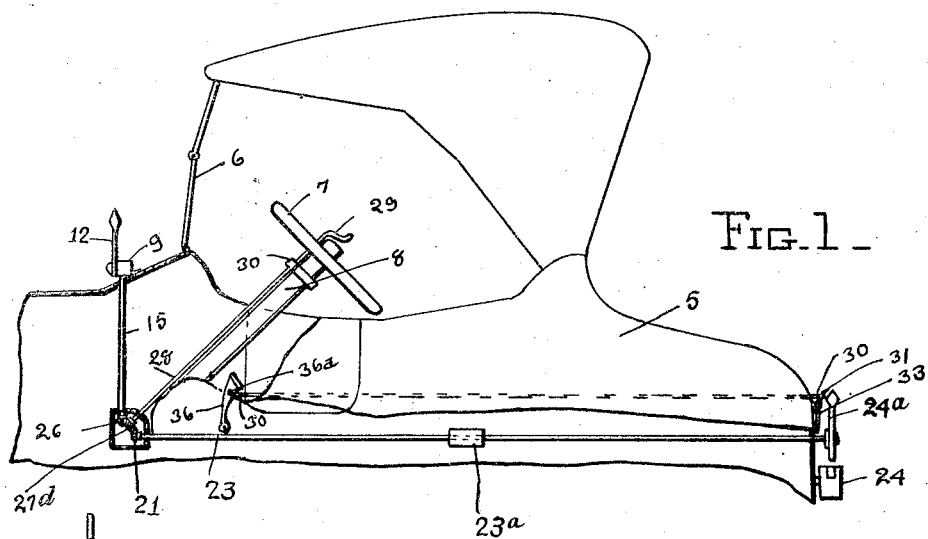
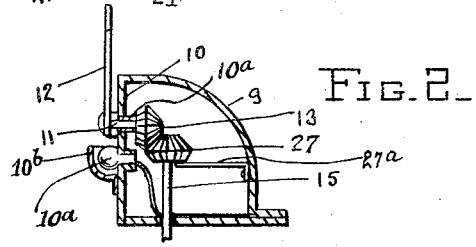
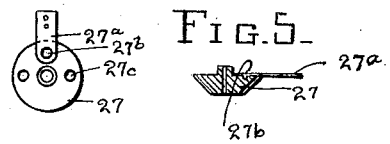
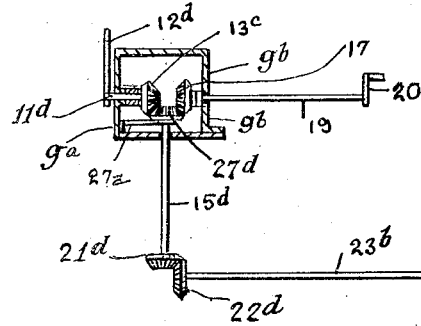
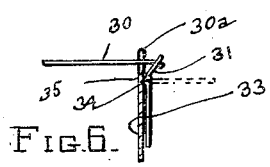
INVENTOR
RICHARD TAEUBERT
Joseph J. O'Brien.
ATTORNEY Patented Sept. 8, 1925.

1,553,121

UNITED STATES PATENT OFFICE.

RICHARD TAEUBERT, OF HOLYOKE, MASSACHUSETTS.

SIGNALING DEVICE.

Application filed March 24, 1921. Serial No. 455,266.

*To all whom it may concern:*

Be it known that RICHARD TAEUBERT, a citizen of the United States of America, residing at Holyoke, in the county of Hampden and State of Massachusetts, has invented certain new and useful Improvements in Signaling Devices, of which the following is a specification.

This invention relates to improvements in traffic or direction signals for automobiles and other vehicles and its leading object is to provide a mechanically operated device which will indicate to a traffic officer, pedestrians and drivers of vehicles the direction of travel a vehicle is about to take.

With the above and other objects in view this invention relates to certain new and useful constructions, combinations and arrangements of parts, clearly described in the following specification and fully illustrated in the accompanying drawings, in which:

Fig. 1 is a side elevation partly in longitudinal section, showing an automobile equipped with my signal device.

Fig. 2 is a vertical sectional view through a signal box.

Fig. 3 is a vertical longitudinal sectional view through a gear box with the cooperating parts shown in elevation.

Fig. 4 is a plan view of the gear showing a latch.

Fig. 5 is a vertical sectional view thereof.

Fig. 6 is a detail view partly in vertical section of the rear end stop.

Referring to the accompanying drawings, 5 designates the body of the vehicle equipped with the usual windshield 6, the steering wheel 7 arranged to operate on the steering post 8.

On the body of the vehicle a signal box 9 is mounted.

This signal box is provided with a front wall 10 through which the shaft 11 carrying the indicator or pointer 12 extends. On the shaft 11 the hub $10^a$ of the bevelled gear 27 is mounted. The bevelled gear 13 meshes with a bevelled gear 27 which is supported to a vertical shaft 15 which extends through the bottom of the signal box or case 9. The lower end of the shaft 15 carries a bevelled gear 26 which meshes with a bevelled gear $27^d$ and the bevelled gear $27^d$ meshes with a gear 21 mounted on the forward end of the shaft 23 which is supported on a bearing $23^a$ carried by the chassis or the body as the case might be. On the rear end of the shaft 23 an indicating arm $24^a$ is mounted which is supported above a lamp house 24 which is adapted to throw vertical rays on the pointer $24^a$. The gear $27^d$ is carried by a shaft 28 supported in parallel relation on the post 8 by means of a bearing 30 and the upper end of the shaft 28 is provided with a crank handle 29 whereby the gear $27^d$ may be manually rotated from a position convenient to the driver's hands.

The front wall of the signal box 9 is equipped with a reflector $10^b$ and a small electric lamp $10^c$ is arranged within the reflector to cast the rays upon the signal indicator 12. By the rotation of the shaft 28 the indicators 12 and $24^a$ may be simultaneously moved in a common direction and by engagement of the projections $27^a$ of the latch 27, with either of the recesses $27^c$ of the gear 27, the indicator will be frictionally retained in a selective position.

In Fig. 3 I show a slight modification of the invention in which a signal box $9^a$ is employed for supporting the shaft $11^d$ of the indicator $12^d$. The bevelled gear $13^c$ of the shaft $11^d$ is engaged by the gear $27^d$ and this gear $27^d$ is directly engaged by the bevelled gear 17, carried by a horizontal shaft 19 which is provided with a terminal crank 20 whereby it may be rotated. The shaft 19 is supported upon the wall $9^b$ of the case $9^a$. The gear $27^d$ is carried by the vertical shaft $15^d$, the lower end of which carries a bevelled gear $21^d$ which engages the bevelled gear $22^d$ of the horizontal shaft $23^b$ on the rear end of which the signal 24 is mounted. When the shaft 19 is rotated the indicator $12^d$ and 24 will be moved to a common direction. The gear 27 is held in selected position by the latch $27^a$ in the manner previously described.

An auxiliary rear signal is provided near the rear end of the automobile or vehicle consisting of a carrier plate 35 to which a signal plate 33 is pivoted at 34. The signal plate 33 has an inclined arm 31 to which the operating rod 30 is connected. This operating rod 30 works through a slot $30^a$ formed in the plate 35. The rod 30 is connected at $36^a$ to the brake pedal 36 so that when the brake pedal is depressed, it throws on the brakes and thus retards the motion of the vehicle, while at the same time raising the signal plate 33 and exposing the rear face of the carrier plate 35 on which a signal is located.

Having described my invention, I claim:

1. A signaling device consisting of a front indicator, a shaft therefore carrying a bevel gear, a vertical shaft carrying a bevel gear in driving engagement with the first bevel gear, a bevel gear on the lower end of the vertical shaft, a horizontal shaft having an indicator on its rear end, a bevel gear on the forward end of the horizontal shaft, and an intermediate bevel gear disposed between the last named bevel gear and the bevel gear on the lower end of the vertical shaft, and a shaft carrying said intermediate bevel gear and extending diagonally therefrom to lie in substantially parallel relation to the steering rod of a standard automobile.

2. A signaling device consisting of a pointer, a pair of cooperating angularly related shafts for operating the pointer to signal position, one of said shafts carrying a member having a series of radially spaced recesses, and a spring latch member having a projection to engage said recesses successively and retain said pointer in selected position.

Signed by me at Holyoke, Mass.

RICHARD TAEUBERT.